United States Patent
Kamioka

(10) Patent No.: US 7,881,166 B2
(45) Date of Patent: Feb. 1, 2011

(54) OPTICAL PICKUP DEVICE

(75) Inventor: Yuichi Kamioka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 588 days.

(21) Appl. No.: 11/904,296

(22) Filed: Sep. 26, 2007

(65) Prior Publication Data

US 2008/0080337 A1     Apr. 3, 2008

(30) Foreign Application Priority Data

Sep. 29, 2006   (JP)   ............................. 2006-267163

(51) Int. Cl.
*G11B 7/00* (2006.01)
(52) U.S. Cl. .............. 369/44.32; 369/112.01; 369/112.24; 369/44.23
(58) Field of Classification Search ............... None
See application file for complete search history.

(56) References Cited

U.S. PATENT DOCUMENTS

| | | | | |
|---|---|---|---|---|
| 4,652,761 A | * | 3/1987 | Kerr et al. | 250/372 |
| 5,689,378 A | * | 11/1997 | Takashima et al. | 359/813 |
| 5,872,760 A | * | 2/1999 | Kim et al. | 369/112.24 |
| 2001/0028625 A1 | * | 10/2001 | Asada et al. | 369/112.24 |
| 2006/0013109 A1 | * | 1/2006 | Fujiwara et al. | 369/112.01 |
| 2007/0014210 A1 | * | 1/2007 | Nishioka | 369/44.32 |
| 2008/0095017 A1 | * | 4/2008 | Kawamura et al. | 369/112.24 |

FOREIGN PATENT DOCUMENTS

JP   2005-209268   8/2005
JP   2005-235269   9/2005

OTHER PUBLICATIONS

Patent Abstracts of Japan for Japanese Publication No. 2005-209268, Publication date Aug. 4, 2005 (2 pages).
Patent Abstracts of Japan for Japanese Publication No. 2005-235269, Publication date Sep. 2, 2005 (2 pages).

* cited by examiner

*Primary Examiner*—Van N Chow
(74) *Attorney, Agent, or Firm*—Osha Liang LLP

(57) ABSTRACT

In an optical pickup device including light sources for emitting laser light, an objective lens for collecting the laser light emitted from the light sources on a disc surface of an optical disc, a light receiving unit for receiving the reflected light reflected by the disc surface, a collimator lens for correcting spherical aberration of the exit light from the objective lens, a lens driving unit for moving the collimator lens in an optical axis direction, and a control unit for controlling the operation of the lens driving unit based on the output of the light receiving unit, the astigmatism of the exit light from the objective lens is corrected by tilting the collimator lens by a predetermined angle by the lens driving unit.

3 Claims, 6 Drawing Sheets

FIG. 4
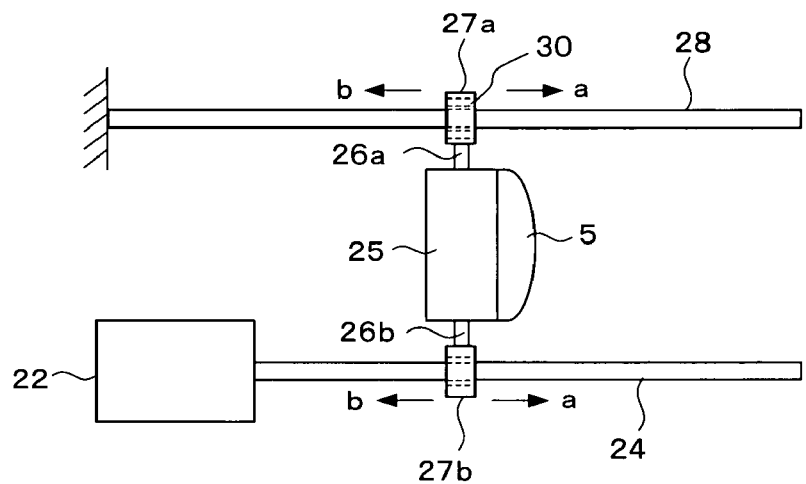
FIG. 5A
FIG. 5B
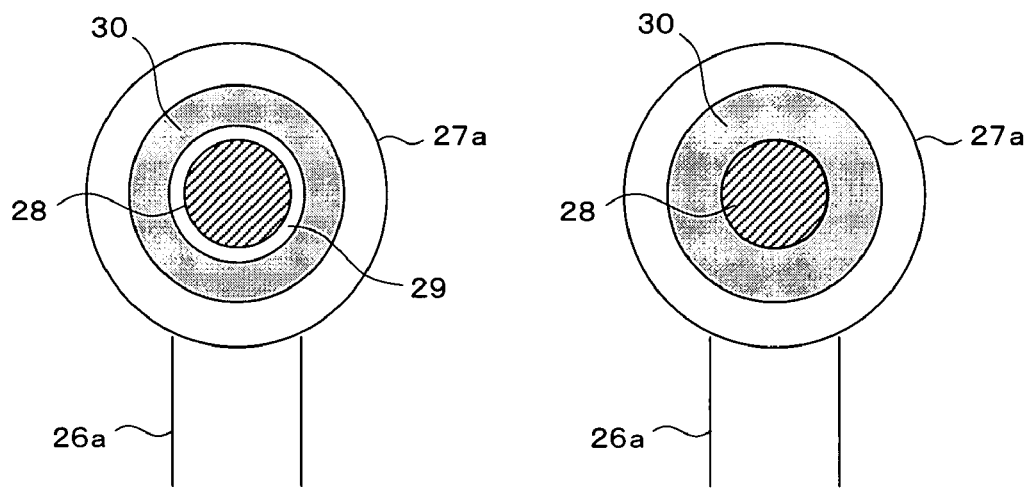

OPTICAL PICKUP DEVICE

BACKGROUND OF THE INVENTION

1. Field of the Invention

The present invention relates to an optical pickup device used for reading information of an optical disc in a DVD recorder, a personal computer, and the like.

2. Description of the Related Art

Generally, in an optical pickup device used in DVD recorder and the like, a laser light emitted from a light source is converted to a parallel light by a collimator lens, and the laser light transmitted through the collimator lens is collected on a disc surface of an optical disc by an objective lens to form an optical spot on the disc surface. In this case, when astigmatism (AS) occurs in the optical spot, the proportion of jitter in a detection signal obtained by receiving the reflected light increases, thereby adversely affecting the reproduction performance.

FIG. 10 is a view describing astigmatism of the optical spot on the disc surface of the optical disc. Reference numeral 50 is a groove, 51 and 52 are lands, 53 is a pit formed in the groove 50, and SP1 is an optical spot for reading the pit 53. FIG. 10A shows a state in which astigmatism is not occurring in the optical spot, where the optical spot SP1 is substantially a perfect circle. FIGS. 10B and 10C show a state in which astigmatism is occurring in the optical spot, where the optical spot SP2 is deformed to be vertically long in FIG. 10B, and the optical spot SP3 is deformed to be horizontally long (so-called cross-shaped AS) in FIG. 10C.

FIG. 9 is a view showing one example of a relationship between the jitter and the astigmatism in a BD (Blu-ray Disc; registered trademark). The horizontal axis indicates the amount of astigmatism of the optical spot on the disc surface, and the vertical axis indicates the proportion of the jitter in the detection signal. As the astigmatism becomes greater towards the positive side, the optical spot deforms to be vertically long as shown in FIG. 10B, and as the astigmatism becomes greater towards the negative side, the optical spot deforms to be horizontally long as shown in FIG. 10C. The shaded area of FIG. 9 shows the margin region of the amount of astigmatism when a tolerable range of 1% is set with respect to a bottom jitter (a minimum value of jitter). Since the value of the bottom jitter is about 6%, 7% is the upper limit value, and the margin of the amount of astigmatism is in the range of −40 [λm] to +10[λm].

According to FIG. 9, the amount of astigmatism when the jitter becomes a minimum is not 0, but is slightly shifted to the negative side from 0. That is, the jitter becomes a minimum not when the optical spot is a perfect circle, but when slightly horizontally long. This tendency is the same in CD (Compact Disc) and DVD (Digital Versatile Disc) (it should be noted that the amount of astigmatism when the jitter becomes minimum differs depending on the medium). The factor for the amount of astigmatism corresponding to the bottom jitter to shift towards the negative side includes interference (intersymbol interference) with respect to pits adjacent in a track direction being less likely to occur when the optical spot becomes horizontally long. Therefore, the reproduction performance can be enhanced by correcting the amount of astigmatism to an optimum value at which the jitter becomes a minimum.

One of the methods for correcting the astigmatism includes a method of using liquid crystal element. In this method, the liquid crystal element is arranged on a light path between a light source and an objective lens, and an electrode of a predetermined pattern for correcting the astigmatism is arranged on each of a pair of substrates of the liquid crystal element. The orientation direction of the liquid crystal molecule of the portion sandwiched by the electrodes is changed by controlling the voltage to be applied to the electrodes, and the astigmatism of the optical spot is corrected by providing a phase difference to the light transmitting through such portion. According to such method, however, the electrode pattern that corresponds to each wavelength must be formed when reading the medium corresponding to a plurality of wavelengths such as BD, DVD, and CD with one optical pickup, whereby the number of layers of the electrode pattern becomes large, and the cost of the liquid crystal element itself becomes high.

In place of the method using the liquid crystal element described above, a method of correcting the astigmatism by adjusting the tilt of the collimator lens may be adopted. In this method, the collimator lens is fixed through adhesion while being tilted by an optimum angle (at which jitter becomes a minimum) in advance in time of adjustment. However, according to this method, since the collimator lens is fixed, the astigmatism cannot be corrected for each light source if light sources corresponding to a plurality of wavelengths are provided. For example, when the tilt of the collimator lens is adjusted with respect to the light from the BD light source, the jitter can be minimized with respect to the BD but the jitter cannot be minimized with respect to the DVD and the CD since the amount of astigmatism at which the jitter becomes a minimum differs depending on the medium.

The optical disc also has a problem of spherical aberration in addition to astigmatism described above. For example, when reproducing a medium having two recording layers, the spherical aberration of the second recording layer becomes large if adjusting the spherical aberration focusing on the first recording layer, and the spherical aberration of the first recording layer becomes large if adjusting the spherical aberration focusing on the second recording layer, whereby the reproduction performance lowers. Therefore, a correction that minimizes the spherical aberration in each layer is required. For such correction, a method of moving the collimator lens in an optical axis direction is disclosed in Japanese Unexamined Patent Publication No. 2005-235269 and Japanese Unexamined Patent Publication No. 2005-209268. However, the spherical aberration and the astigmatism cannot be simultaneously corrected by simply moving the collimator lens in the optical axis direction.

SUMMARY OF THE INVENTION

In view of the above problems, it is an object of the present invention to provide an optical pickup device capable of correcting the astigmatism according to each medium to minimize the jitter even when reproducing the media corresponding to a plurality of wavelengths with one optical pickup and simultaneously performing correction of astigmatism and correction of spherical aberration.

The present invention provides an optical pickup device including a light source for emitting a laser light; an objective lens for collecting the laser light emitted from the light source on a disc surface of an optical disc; a light receiving unit for receiving a reflected light reflected by the disc surface; an aberration correcting lens for correcting aberration of an exit light from the objective lens; a lens driving unit for moving the aberration correcting lens in an optical axis direction; and a control unit for controlling the operation of the lens driving unit based on an output of the light receiving unit; wherein the lens driving unit tilts the aberration correcting lens by a predetermined angle to correct astigmatism of the exit light from the objective lens.

In this manner, the aberration correcting lens can correct the spherical aberration by being moved in the optical axis direction and correct the astigmatism by being tilted since the aberration correcting lens is movable in the optical axis direction and can be tilted by a predetermined angle by the lens driving unit. Furthermore, since the tilt of the aberration correcting lens is freely adjustable by the lens driving unit, the optimum tilt adjustment suitable for each of the various media can be performed by controlling the tilt angle of the aberration correcting lens so that, for example, the jitter becomes a minimum while monitoring the jitter detected from the output of the light receiving unit by the control unit. As a result, satisfactory reproduction performance can be maintained even when reproducing the media corresponding to a plurality of wavelengths with one pickup.

The lens driving unit of the present invention can be configured by a first motor, a first rotation shaft which rotates by the operation of the first motor, a second motor, and a second rotation shaft which rotates by the operation of the second motor and which is arranged parallel to the first rotation shaft. In this case, the aberration correcting lens is supported by the first and the second rotation shafts. The control unit controls the rotation of the first and second motors to tilt the aberration correcting lens by a predetermined angle.

In place thereof, the lens driving unit of the present invention can also be configured by a motor, a rotation shaft which rotates by the operation of the motor, and a fixed shaft arranged parallel to the rotation shaft. In this case, the aberration correcting lens is supported by the rotation shaft and the fixed shaft, and a friction generating means is arranged at a supporting part on the fixed shaft side to generate friction between the fixed shaft and the supporting part. The control unit rotates the motor while driving the friction generating means and generating friction between the fixed shaft and the supporting part to tilt the aberration correcting lens by a predetermined angle. The friction generating means can be configured by a piezoelectric element arranged so as to surround the fixed shaft. In this case, friction is generated by driving the piezoelectric element to be displaced by a predetermined amount in a radial direction of the fixed shaft.

In a first typical embodiment of the present invention, an optical pickup device includes a light source for emitting a laser light; a collimator lens for converting the laser light emitted from the light source to a parallel light; an objective lens for collecting the laser light transmitted through the collimator lens on a disc surface of an optical disc; a light receiving unit for receiving a reflected light reflected by the disc surface; a lens driving unit for moving the collimator lens in an optical axis direction; and a control unit for controlling the operation of the lens driving unit based on an output of the light receiving unit; wherein the lens driving unit includes a first stepping motor, a first rotation shaft which rotates by the operation of the first stepping motor, a second stepping motor, and a second rotation shaft which rotates by the operation of the second stepping motor and which is arranged parallel to the first rotation shaft. A first supporting part supported by the first rotation shaft and a second supporting part supported by the second rotation shaft are arranged on a holder for holding the collimator lens. The control unit drives the first and the second stepping motors by a same rotation amount and moves the collimator lens by a predetermined amount in the optical axis direction by the rotation of the first and the second rotation shafts to correct spherical aberration of an exit light from the objective lens, and stops one of the first and the second stepping motors and rotates the other stepping motor and tilts the collimator lens by a predetermined angle to correct astigmatism of the exit light from the objective lens.

In a second typical embodiment of the present invention, an optical pickup device includes a light source for emitting a laser light; a collimator lens for converting the laser light emitted from the light source to a parallel light; an objective lens for collecting the laser light transmitted through the collimator lens on a disc surface of an optical disc; a light receiving unit for receiving a reflected light reflected by the disc surface; a lens driving unit for moving the collimator lens in an optical axis direction; and a control unit for controlling the operation of the lens driving unit based on an output of the light receiving unit; wherein the lens driving unit includes a stepping motor, a rotation shaft which rotates by the operation of the stepping motor, and a fixed shaft arranged parallel to the rotation shaft. A first supporting part supported by the fixed shaft and a second supporting part supported by the rotation shaft are arranged on a holder for holding the collimator lens. The first supporting part includes a piezoelectric element arranged so as to surround the fixed shaft. The control unit drives the stepping motor and moves the collimator lens by a predetermined amount in the optical axis direction by the rotation of the rotation shaft to correct spherical aberration of an exit light from the objective lens, and drives the piezoelectric element to be displaced by a predetermined amount in a radial direction of the fixed shaft to generate friction between the piezoelectric element and the fixed shaft, and drives the stepping motor in the relevant state to tilt the collimator lens by a predetermined angle to correct astigmatism of the exit light from the objective lens.

According to the present invention, it is possible to provide an optical pickup device capable of correcting the astigmatism according to each medium to minimize the jitter even when reproducing the media corresponding to a plurality of wavelengths with one pickup and simultaneously performing correction of astigmatism and correction of spherical aberration.

BRIEF DESCRIPTION OF THE DRAWINGS

FIG. 4 is a view showing a driving mechanism of a collimator lens according to a second embodiment of the present invention;

FIG. 5 is an enlarged cross-sectional view of a supporting part;

DESCRIPTION OF THE PREFERRED EMBODIMENT

Figure 1:
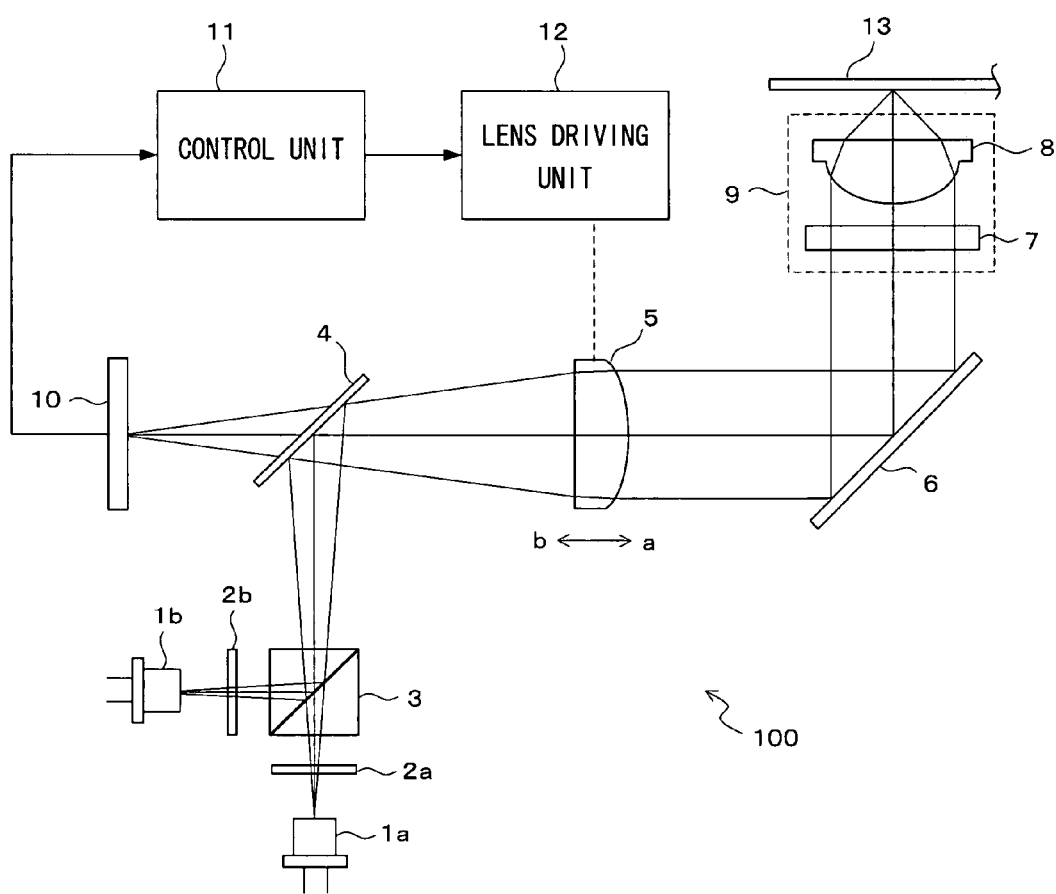
FIG. 1 is a schematic configuration view showing an optical system of an optical pickup device according to the present invention.

FIG. 1 is a schematic configuration view showing an optical system of an optical pickup device according to an embodiment of the present invention. An optical pickup device 100 having compatibility to three wavelengths applicable to three types of discs of CD, DVD, and BD is given by way of example.

In FIG. 1, a light source 1a for CD and DVD includes two semiconductor lasers respectively emitting a laser light having a wavelength of 780 nm and 650 nm. A light source 1b for BD includes a semiconductor laser for emitting a laser light having a wavelength of 410 nm. A diffraction grating 2a is arranged in correspondence to the light source 1a, and a diffraction grating 2b is arranged in correspondence to the light source 1b. A dichroic prism 3 transmits and directly advances the laser light from the light source 1a, and reflects the laser light from the light source 1b and changes the light path by 90°. A half mirror 4 reflects the light that has passed through the dichroic prism 3 at an angle of 90° towards the collimator lens 5 side, and transmits the light from the collimator lens 5 as it is. The collimator lens 5 is a lens that converts the laser light reflected by the half mirror 4 to a parallel light, and is movable in an optical axis direction (direction of arrow ab) as hereinafter described. An up mirror 6 reflects the light that has passed through the collimator lens 5 upward by an angle of 90°.

An aperture 7 limits a numerical aperture of the laser light entering an objective lens 8 to form an optical spot of a predetermined size on the disc surface of the optical disc 13, and the objective lens 8 collects the laser light on the disc surface. The aperture 7 and the objective lens 8 are incorporated in a movable actuator 9. A light receiving unit 10 receives the light reflected by the disc surface of the optical disc 13 through each optical component 4 to 8. A control unit 11 processes the signal output from the light receiving unit 10 and performs a predetermined control, and a lens driving unit 12 drives the collimator lens 5 based on the output from the control unit 11.

The laser light emitted from the light sources 1a and 1b passes through the diffraction gratings 2a, 2b and the dichroic prism 3 and is reflected by 90° by the half mirror 4, and then entered into the collimator lens 5 to be converted to parallel light. The exit light of the collimator lens 5 is collected on the disc surface of the optical disc 13 via the up mirror 6, the aperture 7, and the objective lens 8, thereby a microscopic optical spot is formed. The reflected light reflected by the disc surface of the optical disc 13 is received by the light receiving unit 10 via each optical component 4 to 8. The signal output from the light receiving unit 10 is provided to the control unit 11. The control unit 11 controls the lens driving unit 12 based on the output signal of the light receiving unit 10, and in turn the lens driving unit 12 performs the movement and tilt operation of the collimator lens 5, to be hereinafter described. The control unit 11 detects focus error and tracking error based on the output signal of the light receiving unit 10 and performs servo control such as focus control and tracking control, but the illustration thereof is omitted in FIG. 1 since the servo control system is not directly related to the present invention.

Figure 2:
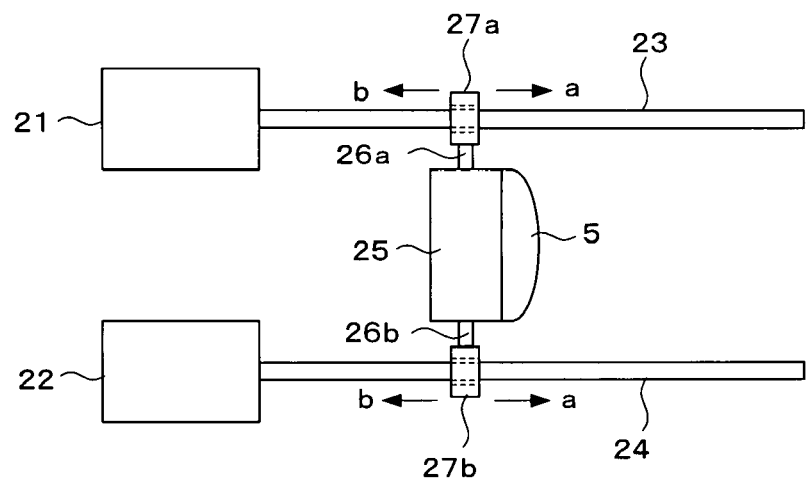
FIG. 2 is a view showing a driving mechanism of a collimator lens according to a first embodiment of the present invention.

FIG. 2 is a view showing a driving mechanism of the collimator lens 5 according to the first embodiment of the present invention. In the figure, reference numerals 21 and 22 are stepping motors, 23 is a rotation shaft which rotates by the operation of the stepping motor 21, and 24 is a rotation shaft which rotates by the operation of the stepping motor 22 and which is arranged parallel to the rotation shaft 23. These components are arranged in the lens driving unit 12 shown in FIG. 1. The stepping motors 21 and 22 rotate by a predetermined amount in response to a pulse signal provided from the control unit 11. The rotation shafts 23 and 24 are formed with a screw part (not shown) across substantially the entire region on the outer periphery. A holder 25 which holds the collimator lens 5 includes a pair of arms 26a and 26b, where a supporting part 27a supported by the rotation shaft 23 and a supporting part 27b supported by the rotation shaft 24 are arranged at the distal end of each arm 26a and 26b, respectively. A screw hole is formed in the supporting part 27a and 27b, and the screw part of the rotation shaft 23 and 24 is screwed into each screw hole. Thus, when the rotation shafts 23 and 24 rotate, the supporting parts 27a and 27b move in "a" direction or "b" direction in the figure according to the rotating direction of the shaft while being guided by the shaft. The collimator lens 5 thus freely moves in the optical axis direction.

The correction of aberration in the first embodiment described above will now be described. The spherical aberration and astigmatism of the optical spot on the disc surface are detected by the control unit 11 based on the output of the light receiving unit 10 that has received the reflected light of the optical spot. As to the detected spherical aberration, the collimator lens 5 is moved in the optical axis direction to correct the aberration, similar to the prior art. That is, the control unit 11 gives a command to the lens driving unit 12 to rotate two stepping motors 21 and 22 of the lens driving unit 12 by the same rotation amount. The respective rotation shaft 23 and 24 also rotate by the same amount through the rotation of the stepping motors 21 and 22. As a result of the rotation, the supporting parts 27a and 27b supported by each shaft move by the same amount. Thus, the collimator lens 5 held by the holder 25 moves in the optical axis direction ("a" direction or "b" direction) according to the rotating direction of the motor while maintaining the posture of FIG. 2. The spherical aberration changes by the movement of the collimator lens 5. The control unit 11 moves the collimator lens 5 while monitoring the amount of spherical aberration, and stops the stepping motors 21 and 22 at a position where the spherical aberration becomes a minimum. The spherical aberration is thereby corrected.

Figure 3:
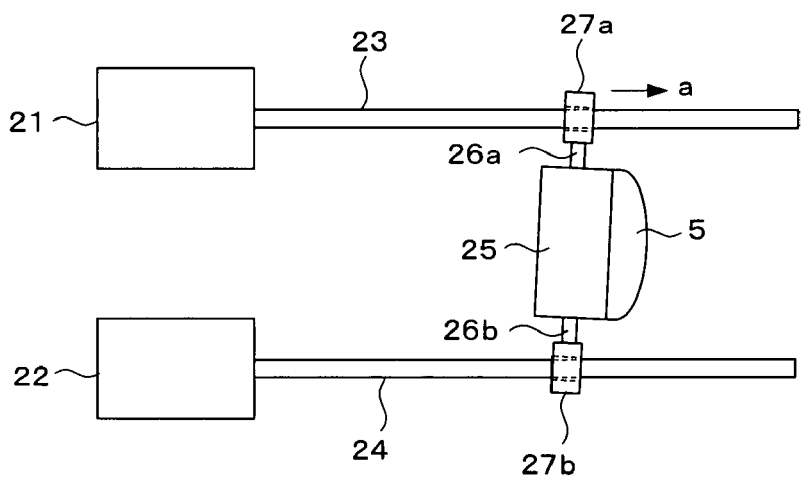
FIG. 3 is a view describing the operation of the collimator lens according to the first embodiment.

The collimator lens 5 is then tilted by the lens driving unit 12 to correct the aberration with respect to the detected astigmatism. In this case, the control unit 11 moves the collimator lens 5 to a predetermined position to correct the spherical aberration as described above, and then rotates only one stepping motor, for example, only the stepping motor 21 and stops the stepping motor 22. The supporting part 27a of the holder 25 then continues to move in the direction of arrow "a", whereas the supporting part 27b does not move. Since a slight gap exists between the screw holes of the supporting parts 27a, 27b and the rotation shafts 23, 24, the collimator lens 5 tilts by a predetermined angle as shown in FIG. 3. The astigmatism changes by the tilt of the collimator lens 5. The control unit 11 rotates only the stepping motor 21 and tilts the collimator lens 5 while monitoring jitter based on the output of the light receiving unit 10, and stops the stepping motor 21 at the position where the jitter becomes a minimum. The amount of astigmatism is thereby corrected to the optimum value corresponding to the bottom jitter.

In the above case, the collimator lens 5 is tilted downward in FIG. 3 by stopping the stepping motor 22 and rotating the stepping motor 21. The collimator lens 5 may be tilted upward in FIG. 3 by stopping the stepping motor 21 and rotating the stepping motor 22. Although one of the stepping motors 21 and 22 is stopped in the above case, the stepping motors 21 and 22 may both be driven and the rotation amount and the rotating direction of the motor may be controlled to adjust the tilt of the collimator lens 5.

FIG. 4 is a view showing a driving mechanism of the collimator lens 5 according to a second embodiment of the present invention. In FIG. 4, same reference numerals are denoted for the portions same as or corresponding to the portions in FIG. 2. Reference numeral 22 is a stepping motor, 24 is a rotation shaft which rotates by the operation of the stepping motor 22, and 28 is a fixed shaft arranged parallel to the rotation shaft 24. These components are arranged in the lens driving unit 12 shown in FIG. 1. The stepping motor 22 rotates by a predetermined amount in response to a pulse signal provided from the control unit 11. The rotation shaft 24 is formed with a screw part (not shown) across substantially the entire region on the outer periphery. The screw part is not formed on the fixed shaft 28. A holder 25 which holds the collimator lens 5 includes a pair of arms 26a and 26b, where a supporting part 27a supported by the fixed shaft 28 and a supporting part 27b supported by the rotation shaft 24 are arranged at the distal end of each arm 26a and 26b, respectively.

FIG. 5 is an enlarged cross-sectional view of the supporting part 27a when FIG. 4 is seen from the right direction. As shown in FIG. 5A, a pass-through hole 29 is formed in the supporting part 27a, and a ring shaped piezoelectric element 30 is arranged in the pass-through hole 29 so as to surround the fixed shaft 28. The piezoelectric element 30 is made up of PZT, and the like, and serves as a friction generating means in the present invention. Means other than the piezoelectric element may be used for the friction generating means. In the normal state, the inner diameter of the piezoelectric element 30 is greater than the outer diameter of the fixed shaft 28, and a certain gap exists between the piezoelectric element 30 and the fixed shaft 28. When voltage is applied to the piezoelectric element 30, the piezoelectric element 30 displaces (extends) by a predetermined amount in the radial direction of the fixed shaft 28, and the piezoelectric element 30 and the fixed shaft 28 closely contact, as shown in FIG. 5B. As a result, friction is generated between the piezoelectric element 30 and the fixed shaft 28. The frictional force can be adjusted by the magnitude of the voltage to be applied to the piezoelectric element 30.

The screw hole is formed in the supporting part 27b, similar to FIG. 2, and the screw part of the rotation shaft 24 is screw fitted to the screw hole. Thus, when the rotation shaft 24 rotates, the supporting part 27b moves in "a" direction or "b" direction in FIG. 4 according to the rotating direction of the shaft while being guided by the rotation shaft 24 and the fixed shaft 28. The collimator lens 5 thus freely moves in the optical axis direction.

The correction of the aberration in the second embodiment described above will now be described. Similar to the first embodiment, the spherical aberration and the astigmatism are detected by the control unit 11 based on the output of light receiving unit 10. As to the detected spherical aberration, the collimator lens 5 is moved in the optical axis direction to correct the aberration. That is, the control unit 11 gives a command to the lens driving unit 12, and rotates the stepping motor 22 of the lens driving unit 12. When the stepping motor 22 rotates, the rotation shaft 24 rotates, and the supporting part 27b supported by the rotation shaft 24 moves by the rotation. At this time, the piezoelectric element 30 of the supporting part 27a is not driven, and friction is not generated between the piezoelectric element 30 and the fixed shaft 28. Hence, the collimator lens 5 held by the holder 25 moves in the optical axis direction ("a" direction or "b" direction) according to the rotating direction of the motor while maintaining the posture of FIG. 4. The spherical aberration changes by the movement of the collimator lens 5. The control unit 11 moves the collimator lens 5 while monitoring the amount of spherical aberration, and stops the stepping motor 22 at the position where the spherical aberration becomes a minimum. The spherical aberration is thereby corrected.

Figure 6:
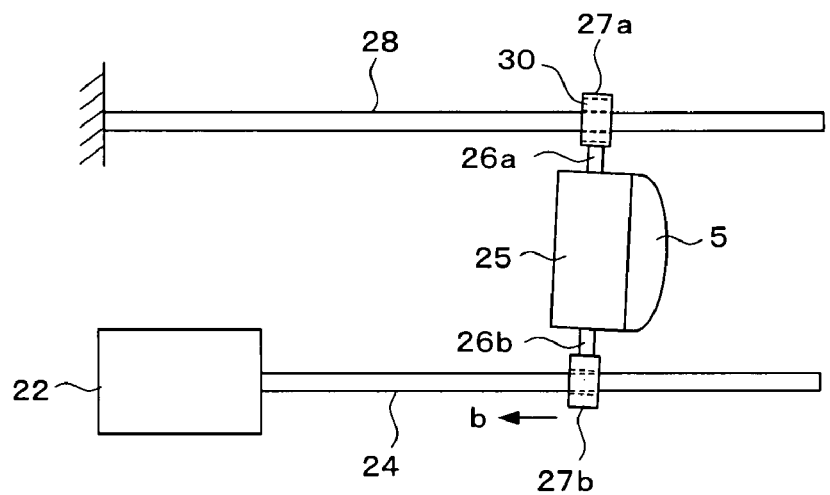
FIG. 6 is a view describing the operation of the collimator lens according to the second embodiment.

The collimator lens 5 is then tilted by the lens driving unit 12 to correct the aberration with respect to the detected astigmatism. In this case, the control unit 11 moves the collimator lens 5 to a predetermined position to correct the spherical aberration as described above, and thereafter, drives the piezoelectric element 30 to be displaced in the radial direction of the fixed shaft 28 as shown in FIG. 5B, and generates friction between the piezoelectric element 30 and the fixed shaft 28. In this friction generated state, when the stepping motor 22 is rotated and the supporting part 27b of the holder 25 is moved in the direction of arrow "b", the collimator lens 5 tilts by a predetermined angle as shown in FIG. 6 since the supporting part 27a does not move due to friction. The astigmatism changes by the tilt of the collimator lens 5. The control unit 11 rotates the stepping motor 22 and tilts the collimator lens 5 while monitoring the jitter based on the output of the light receiving unit 10, and stops the stepping motor 22 at the position where the jitter becomes a minimum. The amount of astigmatism is thereby corrected to the optimum value corresponding to the bottom jitter.

In the above case, the collimator lens 5 is tilted downward in FIG. 6 by rotating the stepping motor 22 and moving the supporting part 27b of the holder 25 in the direction of arrow "b" while driving the piezoelectric element 30. The collimator lens 5 may be tilted upward in FIG. 6 by rotating the stepping motor 22 in the opposite direction and moving the supporting part 27b of the holder 25 in the direction of arrow "a" (FIG. 4). Although the frictional force between the piezoelectric element 30 and the fixed shaft 28 is made strong so that the supporting part 27a cannot move in the above case, the applied voltage of the piezoelectric element 30 may be controlled to adjust the frictional force so that the supporting part 27a can slightly move.

According to each embodiment described above, since the collimator lens 5 is movable in the optical axis direction and can be tilted by a predetermined angle by the lens driving unit 12, the collimator lens 5 can correct the spherical aberration by the movement in the optical axis direction and can correct the astigmatism by the tilt. Furthermore, since the tilt of the collimator lens 5 is freely adjustable by the lens driving unit 12, the optimum tilt adjustment suitable for each of the various media can be performed by controlling the tilt angle of the collimator lens 5 so that the jitter becomes a minimum while monitoring the jitter detected from the output of the light receiving unit 10 by the control unit 11. As a result, satisfactory reproduction performance can be maintained even when reproducing the media corresponding to a plurality of wavelengths with one pickup.

Figure 7:
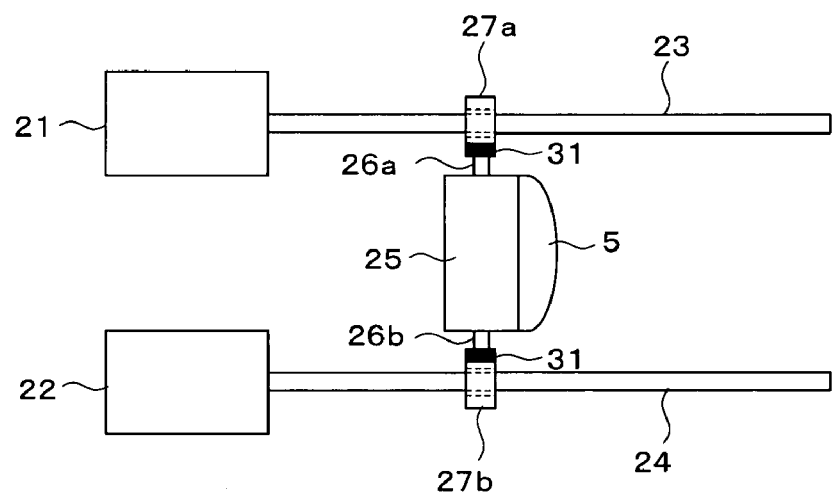
FIG. 7 is a view showing a driving mechanism of the collimator lens according to another embodiment.

In the present invention, various embodiments may be adopted other than the embodiments described above. For instance, in the embodiment of FIG. 2, as shown in FIG. 7, an elastic body 31 such as rubber and the like may be interposed between the arm 26a, 26b and the supporting part 27a, 27b so that forced force will not be applied to the screw-fit part of the supporting part 27a, 27b and the rotation shaft 23, 24 when the collimator lens 5 is tilted. This configuration can also be adopted in the embodiment of FIG. 4.

Figure 8:
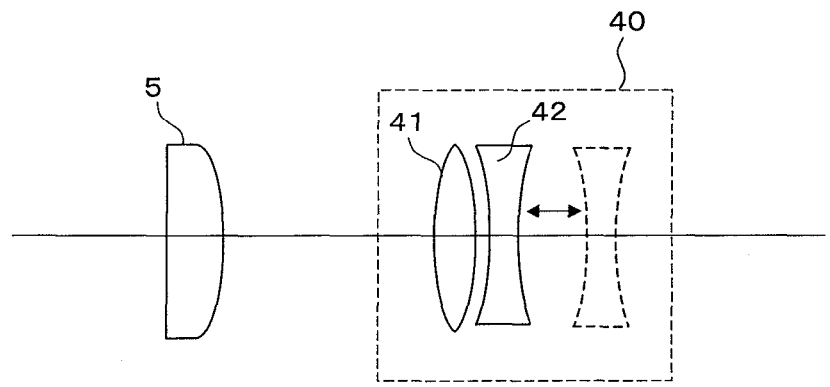
FIG. 8 is a view showing a collimator lens and an expander lens according to another embodiment.
Figure 9:
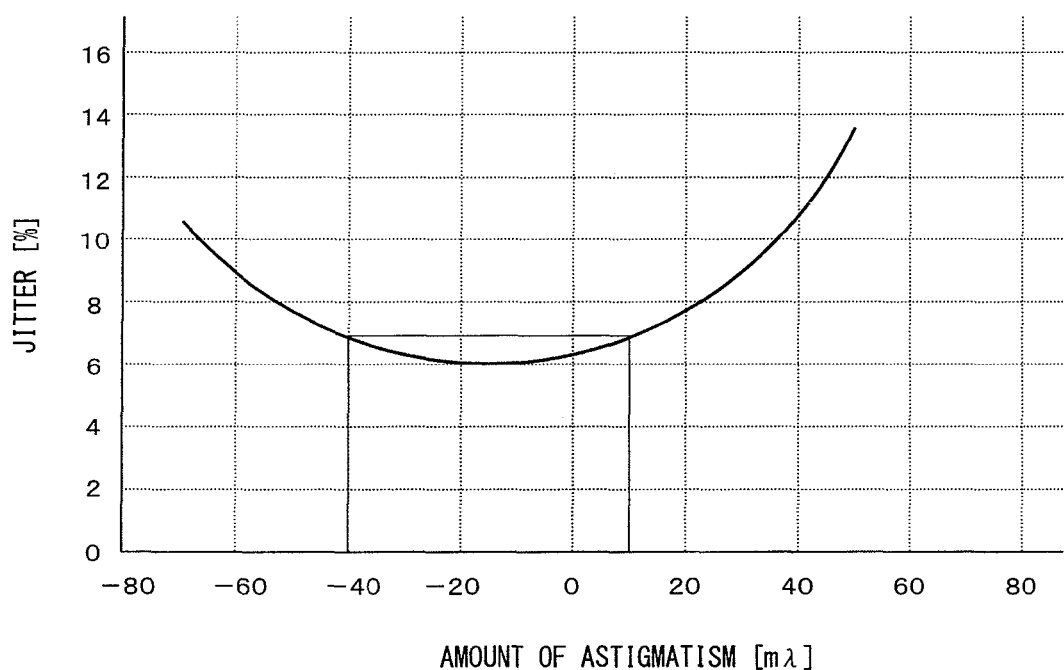
FIG. 9 is a view showing an example of a relationship between jitter and astigmatism.
Figure 10A:
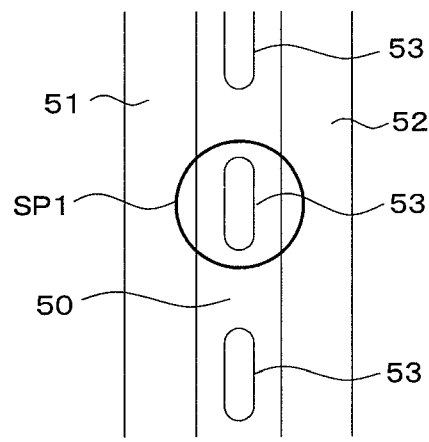
FIG. 10 is a view describing astigmatism of an optical spot.
Figure 10B:
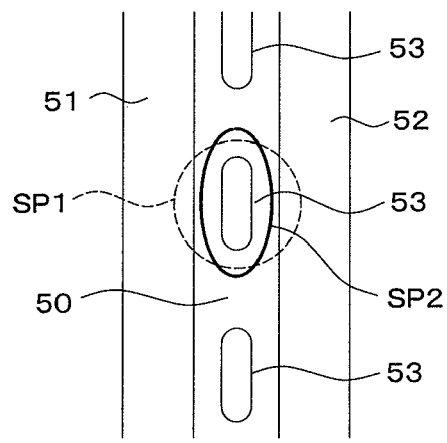
Figure 10C:
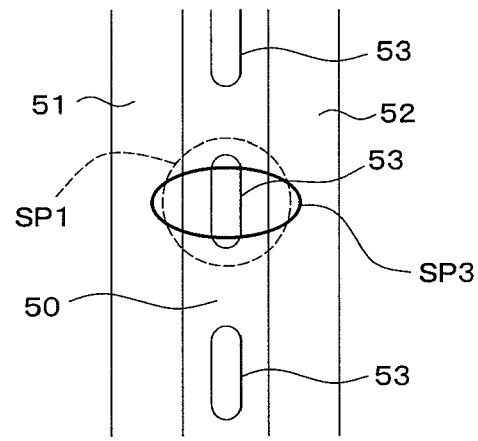

Although the collimator lens 5 is given by way of example as the aberration correcting lens in the embodiment described above, the present invention is also applicable to an optical pickup device in which, as shown in FIG. 8, an expander lens 40 is arranged as an aberration correcting lens in addition to the collimator lens 5. In FIG. 8, the expander lens 40 is made up of a combination of a convex lens 41 and a concave lens 42. One of the lenses, for example, the concave lens 42 is movable in the optical axis direction with respect to the convex lens 41, whereby the correction of the spherical aberration can be performed. The collimator lens 5 and the convex lens 41 may be fixed, and a driving mechanism shown in FIG. 2 and FIG. 4 may be arranged with respect to the concave lens 42, so that the concave lens 42 can be moved in the optical axis direction or tilted to simultaneously perform correction of the spherical aberration and correction of the astigmatism, similar to each embodiment described above. Two driving mechanisms may be arranged, where the collimator lens 5 may be moved in the optical axis direction by one driving mechanism and the concave lens 42 may be tilted by the other driving mechanism to correct the spherical aberration and the astigmatism.

Although the stepping motors 21 and 22 are given by way of example as the motor arranged in the lens driving unit 12 in the embodiments described above, motors other than the stepping motor may be used, and driving means other than the motor may be used.

Furthermore, the optical pickup device 100 compatible to three wavelengths is given by way of example in the embodiment described above, but the present invention is also applicable to an optical pickup device corresponding to wavelengths other than three wavelengths.

What is claimed is:

1. An optical pickup device comprising:
a light source for emitting a laser light;
a collimator lens for converting the laser light emitted from the light source to a parallel light;
an objective lens for collecting the laser light transmitted through the collimator or lens on a disc surface of an optical disc;
a light receiving unit for receiving a reflected light reflected by the disc surface;
a lens driving unit for moving the collimator lens in an optical axis direction; and
a control unit for controlling the operation of the lens driving unit based on an output of the light receiving unit;
wherein the lens driving unit includes a stepping motor, a rotation shaft which rotates by the operation of the stepping motor, and a fixed shaft arranged parallel to the rotation shaft;
a first supporting part supported by the fixed shaft and a second supporting part supported by the rotation shaft are arranged on a holder for holding the collimator lens;
the first supporting part includes a piezoelectric element arranged so as to surround the fixed shaft; and
the control unit drives the stepping motor and moves the collimator lens by a predetermined amount in the optical axis direction by the rotation of the rotation shaft to correct spherical aberration of an exit light from the objective lens, and drives the piezoelectric element to be displaced by a predetermined amount in a radial direction of the fixed shaft to generate friction between the piezoelectric element and the fixed shaft, and drives the stepping motor in the relevant state to tilt the collimator lens by a predetermined angle to correct astigmatism of the exit light from the objective lens.

2. An optical pickup device comprising:
a light source for emitting a laser light;
an objective lens for collecting the laser light emitted from the light source on a disc surface of an optical disc;
a light receiving unit for receiving a reflected light reflected by the disc surface;
an aberration correcting lens for correcting aberration of an exit light from the objective lens;
a lens driving unit for moving the aberration correcting lens in an optical axis direction; and
a control unit for controlling the operation of the lens driving unit based on an output of the light receiving unit;
wherein the lens driving unit tilts the aberration correcting lens by a predetermined angle to correct astigmatism of the exit light from the objective lens;
the lens driving unit includes a motor, a rotation shaft which rotates by the operation of the motor, and a fixed shaft arranged parallel to the rotation shaft;
the aberration correcting lens is supported by the rotation shaft and the fixed shaft, and a friction generating means is arranged at a supporting part on the fixed shaft side to generate friction between the fixed shaft and the supporting part; and
the control unit rotates the motor while driving the friction generating means and generating friction between the fixed shaft and the supporting part to tilt the aberration correcting lens by a predetermined angle.

3. The optical pickup device according to claim 2, wherein the friction generating means includes a piezoelectric element arranged so as to surround the fixed shaft; and
friction is generated by driving the piezoelectric element to be displaced by a predetermined amount in a radial direction of the fixed shaft.

* * * * *